C. G. Wells,
Cotton Bale Tie.
No. 23,518. Patented Apr. 5, 1859.
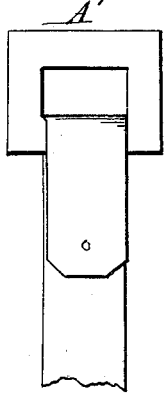
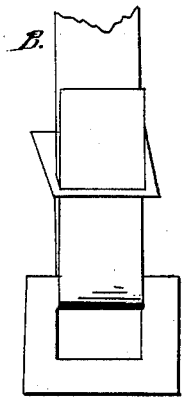
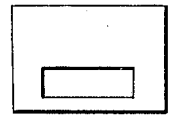
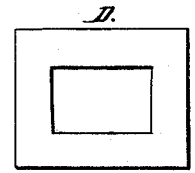
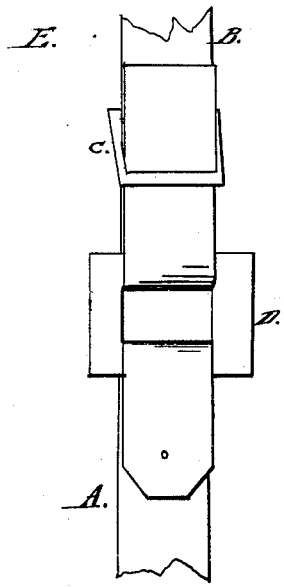
Witnesses:
E. P. Hunt
Wm. A. Collins
Inventor:
Clinton G. Wells

UNITED STATES PATENT OFFICE.

CLINTON G. WELLS, OF GALVESTON, TEXAS.

IMPROVEMENT IN FASTENING IRON BANDS ON COTTON-BALES.

Specification forming part of Letters Patent No. 23,518, dated April 5, 1859.

*To all whom it may concern:*

Be it known that I, CLINTON G. WELLS, of Galveston, in the county of Galveston and State of Texas, have invented a new and improved cotton tie or mode of fastening the ends of iron bands to be used for securing bales of cotton or merchandise, and retaining the bale in a compressed form; and I do hereby declare that the following is a full and exact description thereof, reference being had to the accompanying drawings, and to the letters of reference marked thereon.

The nature of my invention consists in providing an iron band with such a clasp attached, that it may be used conveniently and quickly by the planter or first packer, who compresses the bale only in part, and afterward by the compressor, who reduces the bale to its smallest possible size, without being obliged to cut the tie or measure the bale before the application of the tie and without changing the tie for another, this method enabling the operators to perform double the work in the same space of time than has been done by the modes hitherto employed.

To enable others skilled in the art to make and use my invention, I will proceed to describe its construction and operation.

I make my iron band of hoop-iron, one end of which I pass through the clasp D in the accompanying drawings, and, turning it, rivet it to itself, as shown by Figure A in the accompanying drawings. I also make a washer, C, as shown in the accompanying drawings, also of iron, which is to be used in fastening the other end of the band. The band to be used is to be placed around the bale with the end to which the clasp D is attached standing upright. The other end of the band, upon which the washer C is placed as a slide, is then to be drawn through the clasp D until the band is tight. The end is then to be turned up and laid flat against the band, as shown in B in the accompanying drawings, and the washer slid over the end. The washer C being broader on the inside edge than on the outer, the pressure of the bale against it forces it to lie flat, in which position it prevents the end of the band from drawing through the clasp D. The band and clasp then present the appearance of Fig. E in the accompanying drawings. When the bale is further compressed, the washer C is released by the loosening of the band. The compressor then merely draws the upper end of the band through the clasp D until it is tight, when it is fastened by the washer C, as in the first instance.

What I claim as my invention is—

The application of the washer c and the mode of fastening the end of the band with it, as mentioned above, and thus expediting the operation of baling and compressing bales of cotton or merchandise and retaining them securely in their compressed form.

CLINTON G. WELLS.

Witnesses:
W. VAN BUREN,
THEO. S. GARDNER.